United States Patent
Hsieh et al.

[11] Patent Number: 5,384,615
[45] Date of Patent: Jan. 24, 1995

[54] AMBIENT DEPTH-OF-FIELD SIMULATION EXPOSURING METHOD

[75] Inventors: Min-Lang Hsieh; Shyh-Chin Laih, both of Hsinchu, Taiwan, Prov. of China

[73] Assignee: Industrial Technology Research Institute, Hsinchu, Taiwan, Prov. of China

[21] Appl. No.: 74,047

[22] Filed: Jun. 8, 1993

[51] Int. Cl.⁶ .......................... G03B 3/00; G03B 13/18
[52] U.S. Cl. .................................... 354/409; 354/465
[58] Field of Search ............. 354/409, 465, 219, 289.1

[56] References Cited

U.S. PATENT DOCUMENTS

5,019,852  5/1991  Yamamoto et al. ............... 354/409
5,146,261  9/1992  Soshi ................................. 354/402

*Primary Examiner*—Howard B. Blankenship
*Attorney, Agent, or Firm*—W. Wayne Liauh

[57] ABSTRACT

A method to view sharpness of background or foreground object in a viewfinder of an autofocusing camera without having to change the aperture. The method involves first selecting an appropriate relationship between a simulated depth and a plurality of input parameters including aperture value, focal length, and measured depth. A circle of confusion is calculated using the measured distances of a main object and a foreground or background object, and the aperture value at which the picture is to be taken. The circle of confusion is then used to calculate the simulated background or foreground depth using the maximum aperture value, or any aperture value at which the objects will be viewed. Finally, the simulated depth is used to adjust the focal length and display a simulated background or foreground image through the viewfinder. If the sharpness of the simulated image is not satisfactory, a new aperture value can be selected and the simulation process repeated. Alternatively, a predetermined value of circle of confusion can be stored in the camera to calculate the depth-of-field relative to the main object and display the calculated values through the viewfinder.

6 Claims, 6 Drawing Sheets

AMBIENT DEPTH-OF-FIELD SIMULATION EXPOSURING METHOD

FIELD OF THE INVENTION

The present invention relates to an exposure method for use with an autofocusing camera that simulates the ambient depth-of-field. The autofocusing system and the central processing unit of a camera are employed to show simulated images of the depth-of-field under the maximum aperture so that a photographer can obtain status of the depth-of-field by studying the vagueness of background or foreground throught the viewfinder so as to reduce errors in determining the depth-of-field for easy photographing.

BACKGROUND OF THE INVENTION

Depth-of-field is one of the most important factors in taking a successful picture, even a professional photographer may fail in producing a successful picture if the depth-of-field is poorly managed.

In general, the smaller the aperture is, the longer the depth-of-field gets and vice versa. However, the incoming light is reduced under small aperture and it becomes difficult for the photographer to observe the image of object through viewfinder. Therefore, on most single reflex cameras, the scene is displayed with the maximum aperture for focusing and framing purpose and the aperture is brought down when the release button is pressed to open the shutter for exposure. With this arrangement, the depth-of-field viewed by the photographer through the viewfinder is not the same as that on the actual picture and the photographer has to estimate the depth-of-field and adjust the aperture properly before pressing down the release button.

The common methods for determining the depth-of-field are described as follows:

1. Estimate the depth-of-field by using the depth-of-field scale the lens:

The photographer can use a depth-of-field scale that corresponds to each aperture value on the lens to estimate the possible depth-of-field for every different aperture value. However, it is inconvenient since the photographer has to shift his or her eyesight back and forth between the viewfinder and the scale ring when changing the aperture value. Besides, the precision of the depth-of-field scale is usually poor which can cause errors in reading the scale. Furthermore, this method can only provide a photographer with a rough estimation of the depth-of-field and the information regarding the true vagueness of background and foreground that is related to the actual depth-of-field is not available to the photographer.

2. Check the depth-of-field by using depth-of-field preview button of camera:

The photographer can push down the depth-of-field preview button on the camera to reduce the aperture and check the depth-of-field through the viewfinder. However, since the aperture is reduced after the preview button is pushed, the picture in the viewfinder is darkened and it becomes difficult for the phtographer to determine the depth-of-field and the vagueness of background and foreground.

Due to the many drawbacks in these methods, it is therefore difficult to determine the proper depth-of-field which in turn can cause failures in photographing even for a professional photographer.

There are a great many cameras available in the current market that come with autofocus and autoexposure functions controlled by more advanced software. With these advancements, cameras today can be almost fully automatic. And the current invention is a unique method developed based on these advancements.

Yoshihito Harada has revealed an autofocus camera in the U.S. Pat. No. 5,038,164. The technical merit of this patent is in solving the problem of focusing on two objects in different distances when both objects are to be photographed at the same time. It demonstrates how to use the positions of the two objects of interest, the relationship between in-focus and out-of-focus values, and the position of the lens to determine the aperture value and thus sharply focus on both objects.

Although the '164 has shown that it is capable of finding the aperture value based on the required depth-of-field, it does not provide the photographer with the ability to directly view the area in focus and the vagueness of the background and foreground. It still relies on the commonly used traditional method to estimate the depth-of-field. It has only solved the problem of multipoint focusing and the difficulty encountered by a photographer in determining depth-of-field when composing the layout remains unsolved.

SUMMARY OF THE INVENTION

The main purpose of the current invention is to provide an ambient depth-of-field simulation exposuring method that can be used in determining depth-of-field by directly viewing the vagueness of background or foreground through the viewfinder.

Another purpose of the current invention is to provide an ambient depth-of-field simulation exposuring method which is capable of magnifying the size of the background or foreground so that a photographer can clearly check the depth-of-field.

The third purpose of current invention is to provide an ambient depth-of-field simulation exposuring method that allows the photographer to clearly view the depth-of-field without using the depth-of-field preview button to change the aperture.

The fourth purpose of this invention is to provide an ambient depth-of-field simulation exposuring method that is easy to operate and convenient to be implemented on most cameras that are available in the current market.

DETAILED DESCRIPTION OF PREFERRER EMBODIMENT

This invention is developed to solve the problem of traditional camera in its inability of providing direct view of actual depth-of-field through the viewfinder without changing the aperture. It utilizes the hardware of a current camera, the autofocus system and the central processing unit of the camera to carry out the function for the simulation of depth-of-field so that a photographer can examine the status of depth-of-field through the viewfinder.

The detail of the method and the theory upon which this invention is based are described below:

The depth-of-field corresponds to a different aperture of the camera can be obtained from the following equations:

$$\text{Far Point of Depth of Field } T_F = \frac{D \cdot f^2}{f^2 - D \cdot C \cdot N} \quad (1)$$

$$\text{Near Point of Depth of Field } T_N = \frac{D \cdot f^2}{f^2 + D \cdot C \cdot N} \quad (2)$$

D = Distance from the object
F = Focal length
C = Circle of confusion (set to 0.03 mm)
N = Aperture Value Substituting the known values for the variables in the two equations, the values of far point TF and the near point TN of depth-of-field can be computed and the circle of confusion value 0.03 mm that relates to the range of depth-of-field is focused.

By using these two equations with the methods of this invention, which will be described in the following, the sharpness of object of interest in the background or foreground can be simulated.

It is worth noting that the two simulation equations mentioned aboved are merely the preferred equations for the computation and they are not the only equations for the purpose. There are other equations that can also be used for simulating the range of the depth-of-field with acceptable results. Therefore, this invention can also use other simulation equations to simulate the depth-of-field.

Figure 1:
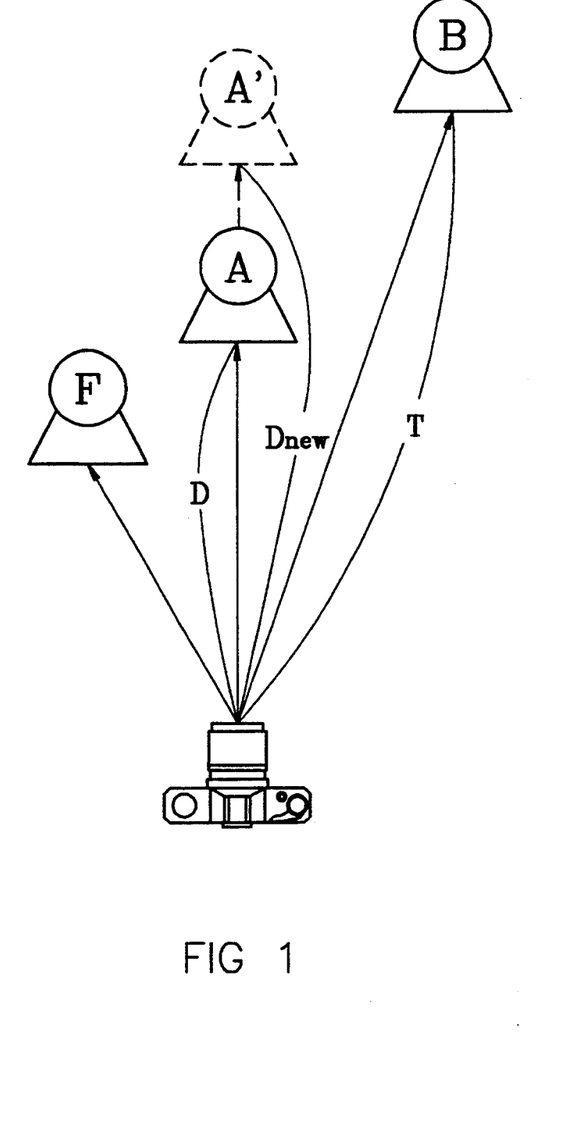
FIG. 1 shows the relative positions of main object, foreground, background, and the pseudo main object to the camera to help illustrating the operations of this invention.

As shown in FIG. 1, distance D from the main object can be obtained by focusing on the main object A, and distance T from the background object B (or foreground object F) can be obtained by focusing on the object B. Substituting the distance T and the selected N value into equation 1 or other similar simulation equations and the size of circle of confusion C that corresponds to the image of object B formed on the film under aperture value N can be obtained. (If the object of interest is F in the foreground, equation 2 should be used). Substituting C and the maximum aperture value of the camera into equation 1 or other similar simulation equations to compute the distance Dnew from the pseudo object A1 and set the focusing spot of the lens to distance Dnew (this is accomplished by the autofocus system of the camera). The image of object B displayed in the viewfinder at this moment should carry the sharpness of the image in actual picture.

By using the methods and equations described above, the photographer can obtain the status of depth-of-field by checking the sharpness of the image formed in the viewfinder for object in the foreground or background without changing the aperture.

Figure 2:
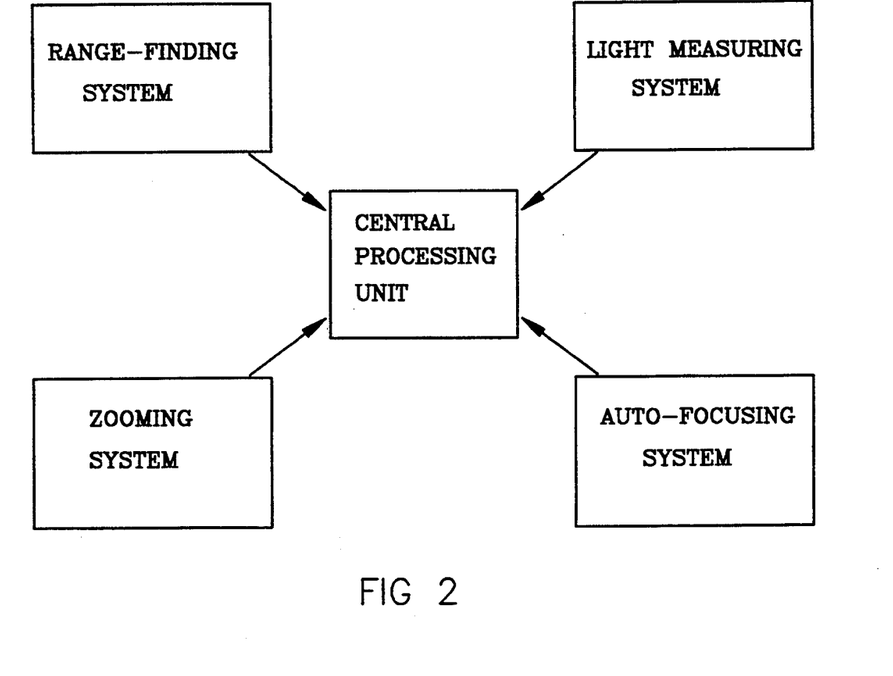
FIG. 2 shows the system configuration of this invention.

As shown in FIG. 2, the system configuration of this invention includes: a central processing unit for data processing; a range finding system for measuring the distance between the object and the camera; a light measuring system for measuring the required aperture and shutter speed for a correct exposure; a zooming system for magnifying the object in background or foreground in order to determine the sharpness of the object; an autofocusing system for fast and accurate focusing and proper defocusing.

The hardware structure of this invention is exactly the same as that of a camera available in the current market. It utilizes the automatic range finding system to measure the distance of main object and the distances of other object of interest from the camera, the central processing unit to carry out simulation of depth-of-field based on the aforementioned methods, the autofocusing system to automatically defocus to simulate the vagueness of the formed image of object of interest, and the automatic light measuring system to adjust for the correct exposure value to help the photographer in making successful pictures. If the zoom lens is used during the observaion process of depth-of-field, photographer can utilize the longer focus of the zooming system to determine the sharpness of the object.

Figure 3:
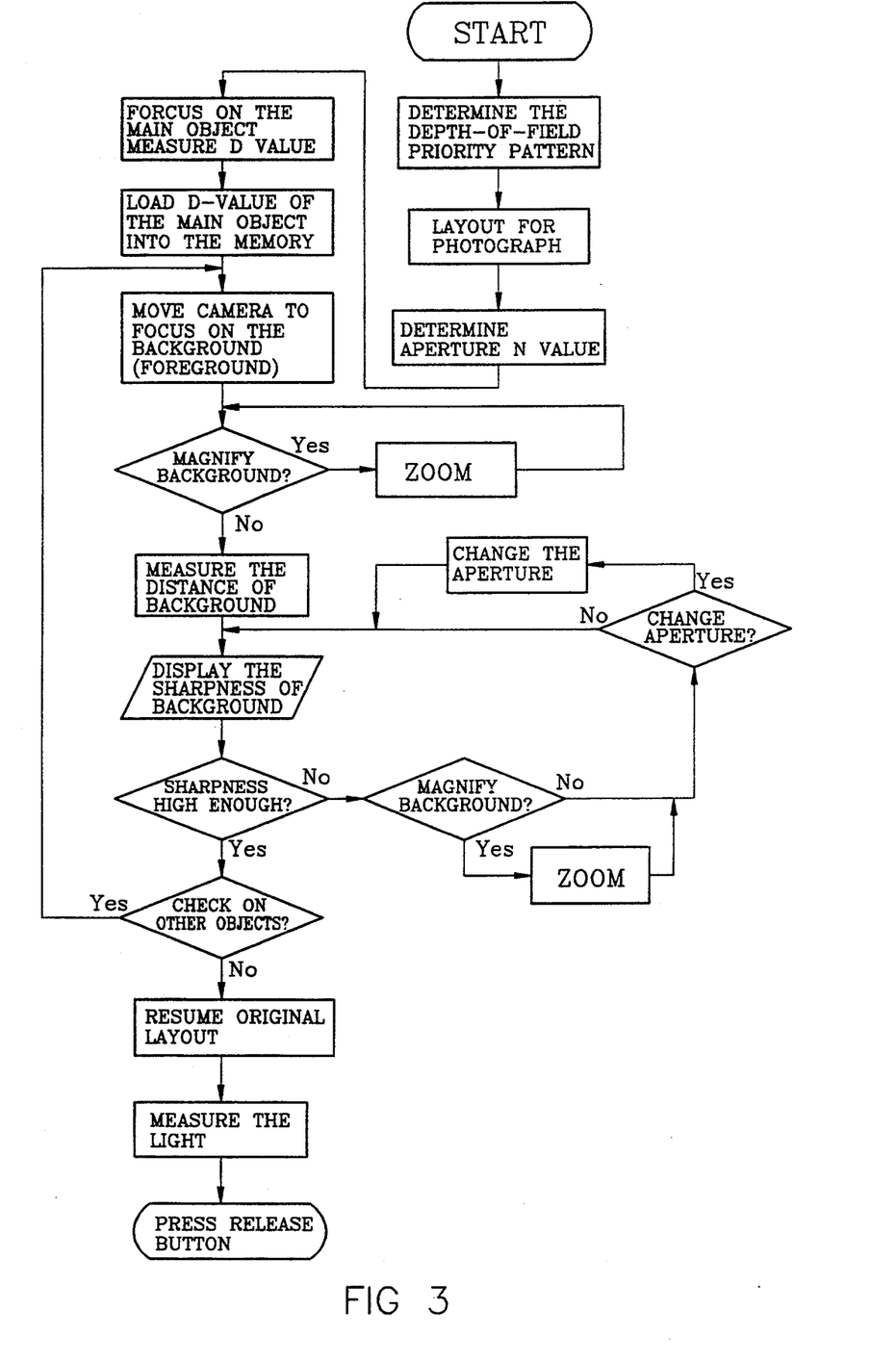
FIG. 3 shows the flowchart for operations of this invention.
Figure 4:
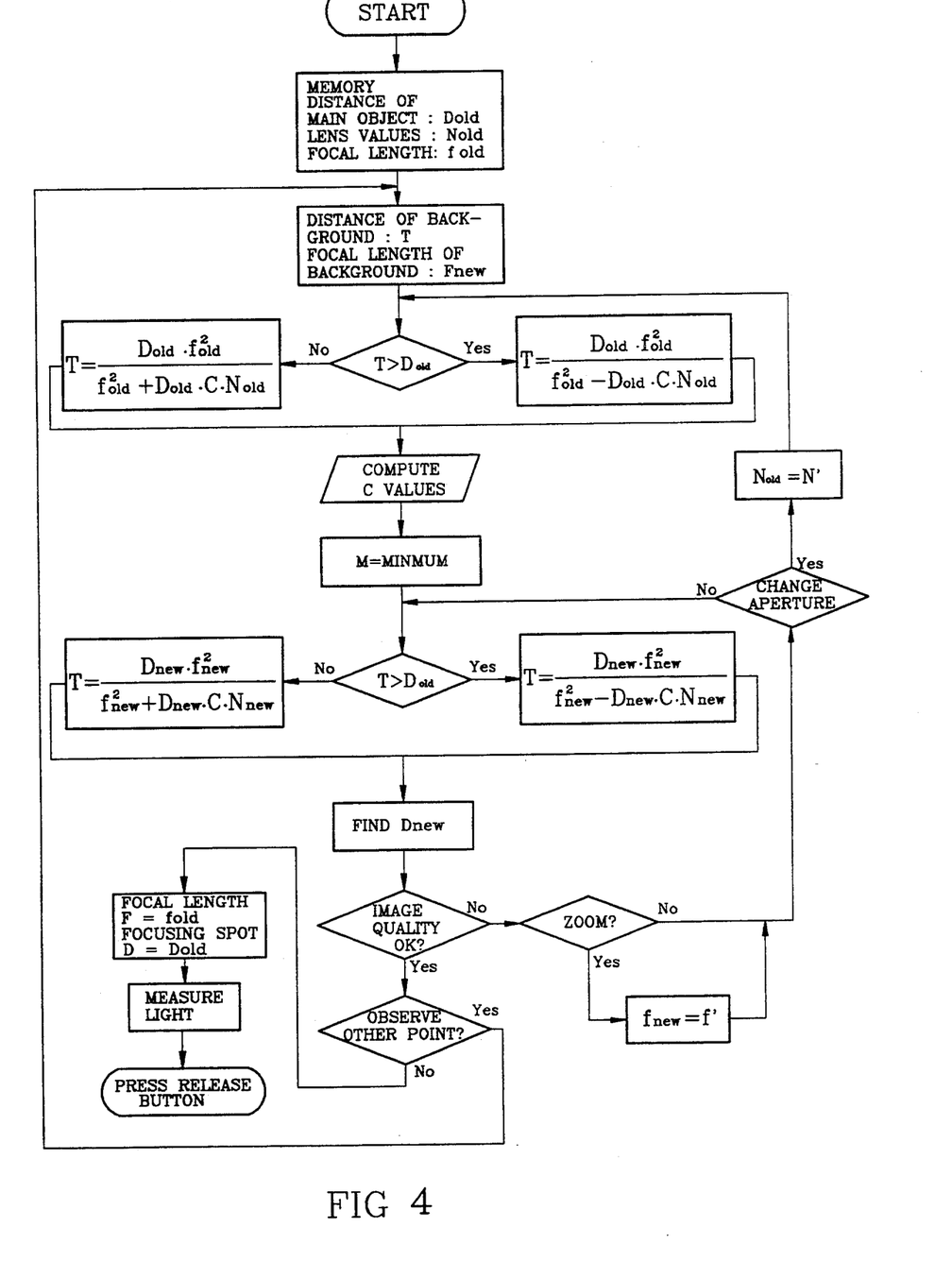
FIG. 4 shows the flowchart for data processing of this invention.
Figure 4A:
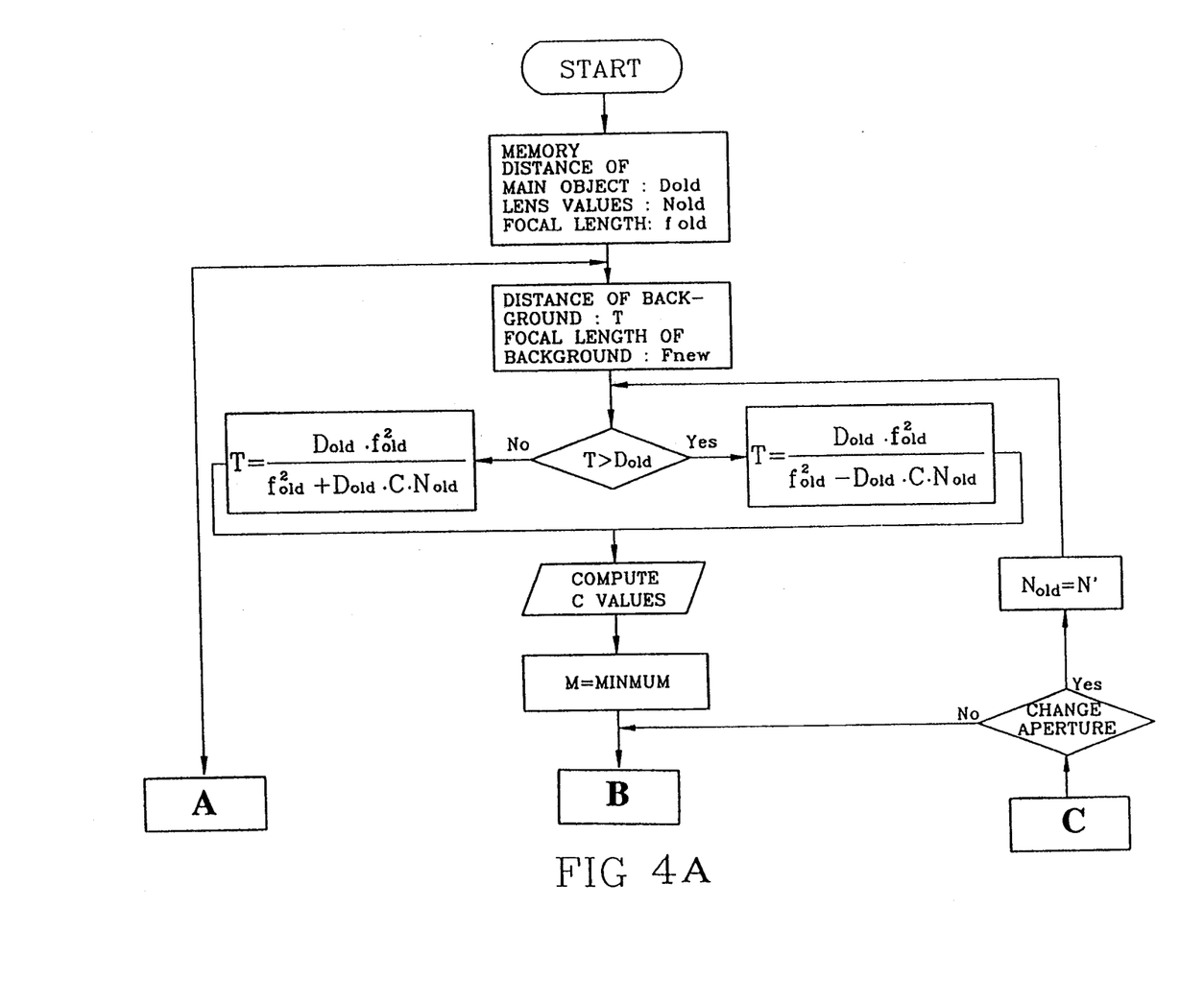
Figure 4B:
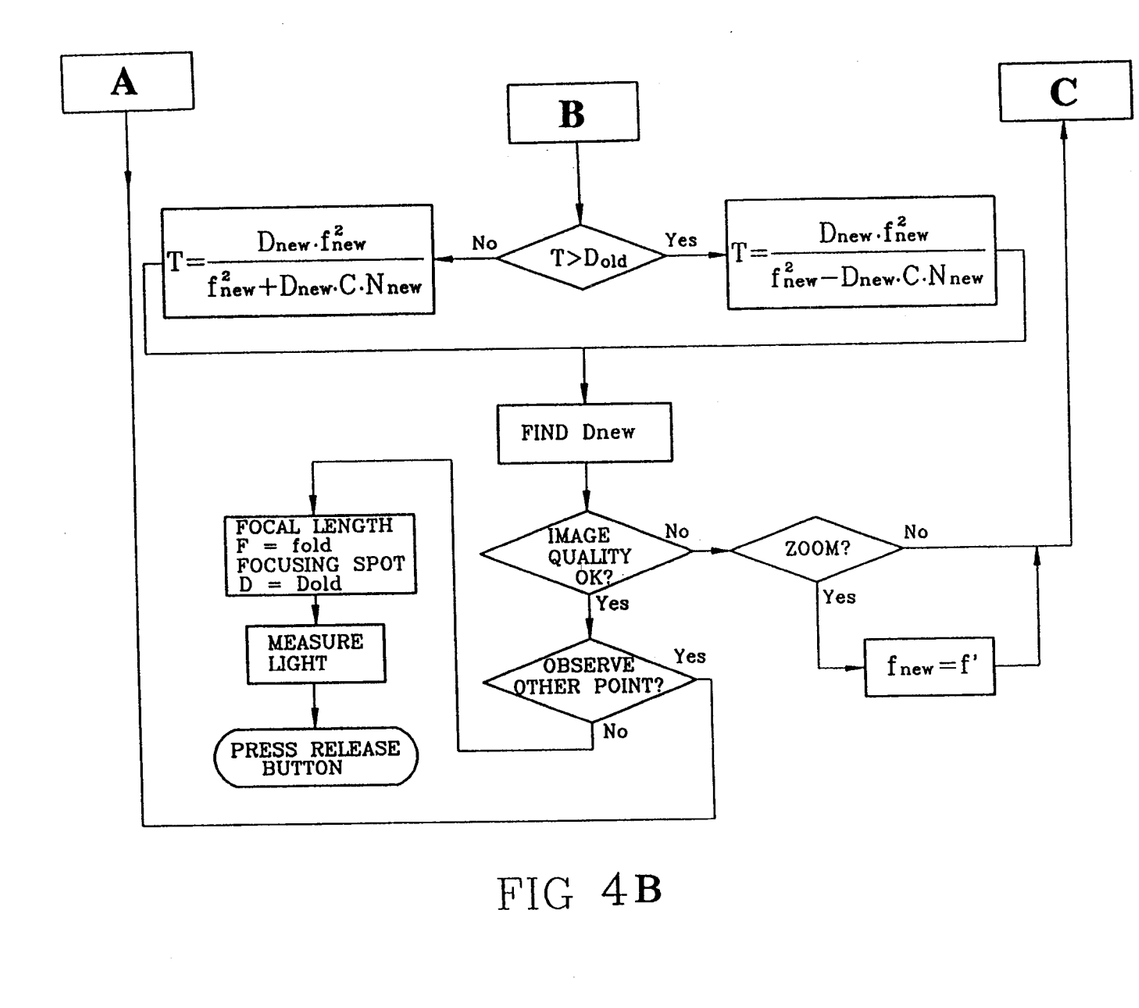

The flowchart for operation of this invention is shown in FIG. 3 to demostrate each operational procedures of this invention. The flowchart for software data processing as shown in FIG. 4 illustrates the steps followed by the central processing unit of camera in simulating the depth-of-field.

When operating this invention, the photographer should first set the camera so that the depth-of-field priority exposure pattern will be used. Next step is to move the camera to frame the scene in order to select the aperture value Nold. Next step is to focus on the main object so that the distance Dold of the main object from the camera can be measured. Then the central processing unit will record the focus fold, main object distance Dold, and aperture value Nold.

The photographer can then move the camera to focus on the object of interest. If the object is to be magnified for easier observation, the zooming system can be used to magnify the object. By focusing on the object, the distance of the object from the camera can be measured as the background distance T. The central processing unit of the camera will then record the distance T and the focus fnew after zooming.

After the photographer completes the framing of the scene and focusing and defocusing, the central processing unit will proceed with the simulation compution of depth-of-field. The first step for the central processing unit in simulating the depth-of-field is to compare the values of object distance T and the main object distance Dold in order to determine the object is in the background or foreground.

If the object is in the background, the following equation can be used to find the circle of confusion C for the formed image of the object:

$$T = \frac{D_{old} \cdot f^2_{old}}{f^2_{old} - D_{old} \cdot C \cdot N_{old}}$$

If the object is in the foreground, following equation should be used to find the circle of confusion C for the formed image of the object:

$$T = \frac{D_{old} \cdot f^2_{old}}{f^2_{old} + D_{old} \cdot C \cdot N_{old}}$$

The vague circle C, the focus fnew after zooming, and the minimum aperture value Nnew (i.e., the aperture value when the lens aperture is fully opened) are substituted into the equations mentioned above to compute the distance Dnew of the pseudo object. Other similar simulation equations can also be used in the steps above and the results should also be acceptable.

After the central processing unit completes the simulation computations, change the focusing spot of the camera to Dnew by using the autofocusing system. This will enable the simulation of image sharpness of the object of interest when the aperture is fully opened and the lens focus is fnew. The image displayed in the viewfinder at this time is the actual image in the picture with correct depth-of-field.

If the photographer is not satisfied with the sharpness of the image, the aperture value Nold can be changed. The central processing unit will then recompute the depth-of-field and defocus to let the photographer check the sharpness again. The photographer can also change the focus to a higher magnification of the scene to allow easier observation of the sharpness.

When the image sharpness is satisfactory, same observation can be carried out to the other objects. After completion of observation process, the autofocusing system of the camera will automatically bring the focusing spot back to the main object with Dold value and change the focus back to fold to resume the original layout. The photographer can then measure the exposure value using the light measuring system, determine the shutter speed, and push down the release button for a good picture.

Besides the actual simulation of object sharpness as shown in FIG. 3 and FIG. 4, this invention can set the circle of confusion value C to 0.03 mm or some other values before the simulation computations for background or foreground object is carried out so that the far point TF and near point TN of the depth-of-field cab be calculated. The results will be displayed in the viewfinder in data format as reference for the photographer or it will be displayed as symbols in the viewfinder to show the relation of TF and TN to the distancee of the main object. The photographer can use the range of depth-of-field displayed in the viewfinder as the reference for photographing without simulating the depth-of-field to reduce the time for photographing.

Based on the above, we know that this invention allows the photographer to observe the sharpness of the object image in the background or foreground directly from the viewfinder without reducing the aperture to cut down the incoming light. Therefore, the actual depth-of-field can be found and the observation of the object can be done by mangnifying the object using the zoom lens.

In addition, the photographer can change the size of the depth-of-field (by changing the aperture value) while checking the depth-of-field without having to shift the eyesight away from the viewfinder. This feature makes the operation of this invention quite easy for the photographer.

Moreover, this invention allows the photographer to check the sharpness of various objects in the background or foreground during the simulation of depth-of-field so that the depth-of-field relates to each object can be clearly defined to increase the precision of the layout.

Furthermore, the implementation of this invention is convenient since it can be used based on the hardware structure of camera that is available in the current market with proper software.

What is claimed is:

1. A method to view sharpness of background or foreground objects in a viewfinder of an autofocusing camera without having to change aperture, said method comprising the steps of:
    selecting an appropriate relationship between a simulated depth and a plurality of input parameters including aperture value, focal length, and measured depth;
    measuring depths of a main object and a background or foreground object using said autofocusing camera;
    selecting a pre-determined focal length;
    selecting a first pre-determined aperture at which a picture will be taken;
    selecting a second aperture at which an object will be viewed from said viewfinder;
    calculating a simulated depth of background or foreground using said relationship and input parameters including said measured depths, and said first and second selected apertures; and
    using said autofocusing camera to display a simulated background or foreground image in said viewfinder at said calculated simulated depth.

2. A method to view sharpness of background or foreground objects in a viewfinder of an autofocusing camera according to claim 1, wherein:
    (a) said relationship is represented by the following set of equations:

$$D_{new} \text{ (for foreground)} = (D_{old} \times F_{old}^2)/(F_{old}^2 + D_{old} \times C \times N_{old})$$

$$D_{new} \text{ (for background)} = (D_{old} \times F_{old}^2)/(F_{old}^2 - D_{old} \times C \times N_{old}); \text{ and}$$

wherein:
$D_{new}$ is the simulated distance,
$D_{old}$ is the measured distance,
$F_{old}$ is the focus value or focal length,
$C$ is the circle of confusion, and
$N_{old}$ is the aperture value; and
(b) said step to calculate said simulated depth of background or foreground comprising the steps of:
    (i) computing the circle of confusion value C, using the distance from said main object as said measured distance, said distance from said background or foreground object as said simulated distance, the value of $F_{old}$ or $F_{new}$ depending on whether zooming is used, and said first predetermined aperture value as $N_{old}$; and
    (ii) computing the simulated distance $D_{new}$ corresponding to said background or foreground object, using said distance from said background or foreground object as $D_{old}$, said second predetermined aperture value as $N_{old}$, the value of $F_{old}$ or $F_{new}$ depending on whether zooming is used, and said circle of confusion value C obtained from step (b)(i).

3. A method to view sharpness of background or foreground objects in a viewfinder of an autofocusing camera according to claim 2 further comprising the step of changing said first pre-determined aperture if the sharpness of said background or foreground objects in the viewfinder is not satisfactory.

4. A method to view and adjust sharpness of background or foreground objects in a viewfinder of an autofocusing camera without having to change aperture, said method comprising the steps of:

(a) selecting an appropriate first pre-determined aperture value $N_{old}$, at which a picture will be taken, and a focus value $F_{old}$, and recording both $N_{old}$ and $F_{old}$ values;

(b) bringing into focus a main object, measuring distance $D_{old}$ from said main object and recording said $D_{old}$ value;

(c) if zooming is used, then recording an after-zoom focus value $F_{new}$;

(d) bringing into focus an object from background or foreground and measuring and recording distance T from said background or foreground object;

(e) performing a field depth simulation computation which comprises the following steps:

(i) selecting an appropriate simulation equation which relates a simulated distance $D_{new}$ with a plurality of input parameters including a measured distance, a predetermined aperture value, the selected focus value $F_{old}$ or $F_{new}$, and a circle of confusion C;

(ii) using said distance from said main object as said measured distance, said distance from said background or foreground object as said simulated distance, the value of $F_{old}$ or $F_{new}$ depending on whether zooming is used, and said first predetermined aperture value, $N_{old}$, to compute the circle of confusion value C using said simulation from step (e)(i);

(iii) using said distance from said background or foreground object as said measured distance, a second predetermined aperture value, at which said background or foreground object will be viewed, the value of $F_{old}$ or $F_{new}$ depending on whether zooming is used, and said circle of confusion value C obtained from step (e)(ii) to compute a simulated distance $D_{new}$ corresponding to said background or foreground object;

(f) moving lens focus to correspond to said simulated distance value $D_{new}$ and displaying an image of said background or foreground object through said viewfinder of said autofocusing camera; and (g) if the image sharpness of the background or foreground object is not satisfactory, then changing the first pro-determined aperture value $N_{old}$ in steps (a) and (e)(ii) and repeating steps (e)(ii) through (f);

(h) moving lens focus from $D_{new}$ back to $D_{old}$, and focus value to $F_{old}$, if necessary;

(i) measuring exposure value and determining an appropriate shutter speed value; and (j) pressing a shutter button for exposure.

5. The exposure method according to claim 4 wherein said simulation equation is represented by the following set of equations:

$$D_{new} \text{ (for foreground)} = (D_{old} \times F_{old}^2)/(F_{old}^2 + D_{old} \times C \times N_{old})$$

$$D_{new} \text{ (for background)} = (D_{old} \times F_{old}^2)/(F_{old}^2 - D_{old} \times C \times N_{old})$$

wherein $F_{old}$ will be replaced with $F_{new}$ is zooming is used.

6. The exposure method according to claim 4 wherein said second pre-determined aperture is a maximum aperture of said autofocusing camera.

* * * * *